July 8, 1958
E. S. MacPHERSON
2,842,230
MOTOR VEHICLE WHEEL SUSPENSION
Filed Oct. 27, 1955
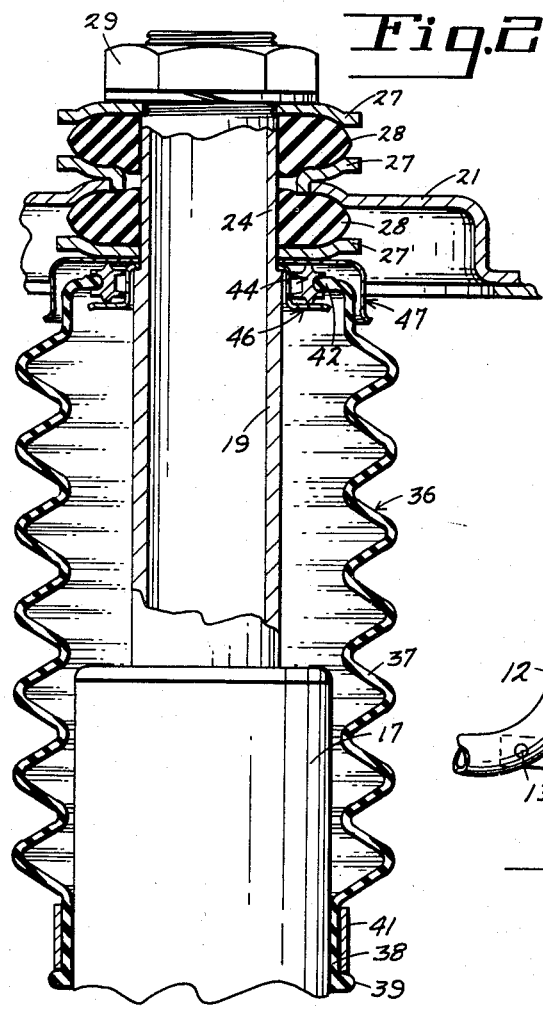
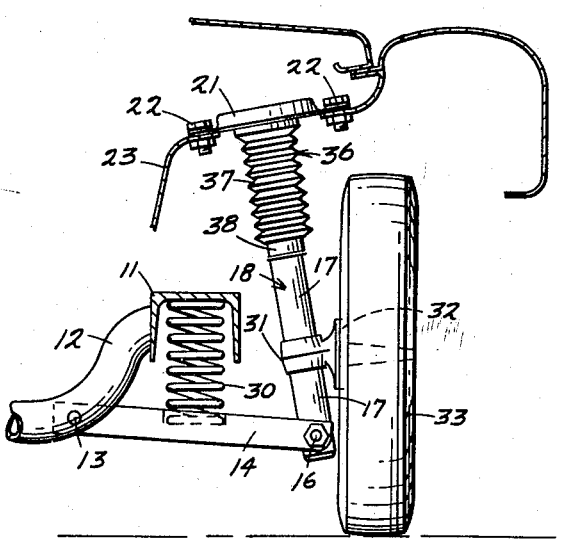
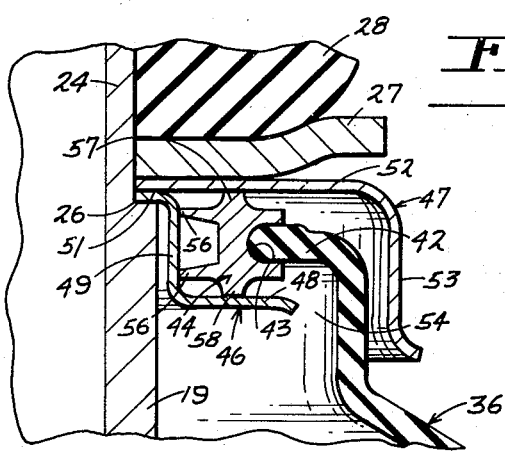
E.S. MacPHERSON
INVENTOR.
BY E.C. McRae,
J. R. Faulkner,
J. H. Oster
ATTYS.

United States Patent Office 2,842,230
Patented July 8, 1958

2,842,230

MOTOR VEHICLE WHEEL SUSPENSION

Earle S. MacPherson, Huntington Woods, Mich., assignor to Ford Motor Company, Dearborn, Mich., a corporation of Delaware Application October 27, 1955, Serial No. 543,133

3 Claims. (Cl. 188—88)

This invention relates generally to motor vehicles, and particularly to a combined hydraulic shock absorber and telescopic control member for an independently suspended road wheel of a motor vehicle.

The present invention is directed to a motor vehicle wheel suspension incorporating a tubular type hydraulic shock absorber and telescopic control member functioning as a shock absorber and also as a control member to assist in supporting and guiding the road wheel. When used with a steerable front wheel the unit forms the pivotal axis for steering movements of the wheel, this being made possible by arranging the inner and outer cylinders of the unit for relative rotation as well as for relative axial movement. A flexible boot is provided to form a seal between the inner and outer cylinders. The boot has an axially extensible intermediate corrugated portion encircling the cylinders to accommodate relative axial movement between the cylinders, and is nonrotatably clamped at one end to one of the cylinders. The opposite end of the boot carries an annular bearing ring rotatably engaging the other cylinder to permit relative rotation between the cylinders while maintaining a seal therebetween.

Other objects and advantages of this invention will be made more apparent as this description proceeds, particularly when considered in connection with the accompanying drawings, wherein:

Figure 1 is a fragmentary front elevational view, partly broken away and in section, of a motor vehicle incorporating the present invention.

Figure 2 is an enlarged vertical cross sectional view of a portion of a structure shown in Figure 1.

Figure 3 is a fragmentary enlarged cross sectional view of a portion of the structure shown in Figure 2.

Referring now to the drawings, the reference character 11 indicates a side frame rail of a motor vehicle. A transversely extending cross frame member 12 is welded to the side frame rail 11 and pivotally supports at 13 a wishbone type suspension arm 14. At its outer end the suspension arm 14 is connected by means of a pin type baill joint 16 to the lower end of the outer lower cylinder 17 forming part of a combined hydraulic shock absorber and telescopic control unit 18.

Telescopically received within the outer cylinder 17 is an inner cylinder 19. The two cylinders 17 and 19 are arranged for relative axial movement and also for relative rotation.

At its upper end the inner cylinder 19 extends through an opening in a mounting plate 21 secured by bolts 22 to a body panel 23 forming part of a unitary frame and body structure. It will be noted that the upper end 24 of the inner cylinder 19 is reduced in diameter to form a shoulder 26. Retaining plates 27 and annular rubber mounting rings 28 are sleeved upon the reduced end 24 of the cylinder 19 and are held in place between the shoulder 26 and a nut 29 threaded upon the upper end of the cylinder.

The cylindrical portion 31 of a wheel spindle 32 is sleeved over the lower cylinder 17 and suitably welded thereto. The spindle 32 rotatably supports a front road wheel 33. A coil spring 30 is assembled between the side frame rail 11 and the suspension arm 14.

It will be seen from the foregoing that rising and falling movements of the road wheel 33 are accommodated by relative axial movement between the inner and outer cylinders 19 and 17 respectively of the control unit 18. Steering movement of the road wheel 33 takes place about the axis of the control unit 18, and results in relative rotation between the inner and outer cylinders.

A boot 36 encircles the upper portion of the control unit 18, and has an intermediate axially extensible corrugated portion 37. The boot 36 is formed of an elastic material such as rubber or a suitable synthetic.

An annular flange 38 is internally formed at the lower end of the boot 36 and closely embraces the outer cylinder 17. The flange 38 terminates in a bead 39. An annular clamping ring 41 encircles the flange 38 to nonrotatably clamp the latter to the outer cylinder 17.

The upper end of the boot 36 terminates in a radially inwardly directed flange 42 received within a groove 43 formed in the outer periphery of an annular sealing ring 44. The annular sealing ring 44 is received within and guided by a guideway formed of a pair of sheet metal members 46 and 47.

The lower guide member 46 has a lower flange 48 extending at right angles to the axis of the control unit 18 and an intermediate annular hub 49 encircling the inner cylinder 19 of the control unit. At its upper end the annular hub 49 of the guide member 46 is formed with an intergral radially inwardly directed flange 51 seated upon the shoulder 26 formed between the body portion of the inner cylinder 19 and the reduced upper portion 24 thereof.

The upper guide member 47 has an upper flange 52 extending at right angles to the axis of the control unit 18, the upper flange 52 being seated upon the radially inwardly directed fiange 51 of the lower guide member 46. The upper guide member 47 is also formed with an annular peripheral flange 53 extending axially and overlapping the lower flange 48 of the lower guide member 46. It will thus be seen that the upper and lower guide members 47 and 46 form a guideway carried by the inner cylinder 19. This guideway is in the form of an annular enclosed channel having a generally box shaped cross section provided with an annular opening 54 between the outer periphery of the lower flange 48 of the lower guide member 46 and the peripheral flange 53 of the upper guide member 47. The opening 54 accommodates the upper end of the boot 36, and the upper flange of the boot and the annular sealing ring 44 are contained within the guideway.

Referring particularly to Figure 3, it will be seen that the annular sealing ring 44 is formed with a pair of radially inwardly projecting annular ribs 56 having an internal diameter corresponding to the diameter of the hub portion 49 of the lower guide member 46 to provide an effective seal therebetween while at the same time permitting relative rotation between the sealing ring and the guide member. The upper and lower portions of the sealing ring 44 are formed with annular ribs 57 and 58 adapted to engage the adjacent flanges 52 and 48 of the guide members 47 and 46 respectively. It will be apparent from the foregoing that the sealing ring is mounted for free rotation within the guideway. The ribs 56, 57 and 58 promote an effective seal and at the same time permit the rotation of the sealing ring with a minimum of friction. The sealing ring 44 is preferably formed of a material such as carbon or nylon having low frictional characteristics.

The boot 36 forms a protective seal between the cylinders 17 and 19 and freely accommodates relative axial movement between the two. During steering movement of the road wheel 33 about the axis of the control unit 18, the boot 36 rotates with the outer cylinder 17, being clamped thereto at its lower end by means of the clamp 41. The resulting relative rotation between the upper end of the boot and the inner cylinder 19 is accommodated by means of the construction described above, providing an effective seal and a minimum of frictional resistance and wear between the parts thereof.

It will be understood that the invention is not to be limited to the exact construction shown and described, but that various changes and modifications may be made without departing from the spirit and scope of the invention, as defined in the appended claims.

What is claimed is:

1. A combined hydraulic shock absorber and telescopic control member for a steerable road wheel of a motor vehicle having a sprung member and a wheel spindle upon which said road wheel is rotatably mounted, comprising an upper cylinder adapted to be connected to said sprung member, a lower cylinder telescopically associated with said upper cylinder, bearing means between said cylinders permitting rotary and axial movement of said lower cylinder relative to said upper cylinder, said wheel spindle being mounted upon said lower cylinder so that steering movement of said road wheel effects rotary movement of said lower cylinder relative to said upper cylinder, a flexible boot having an axially extensible intermediate corrugated portion encircling said cylinders, said boot having one end secured to one of said cylinders, and an annular bearing ring carried by the opposite end of said boot, said bearing ring being formed of a friction reducing material and having axially spaced radially inwardly directed flanges bearing against a cylindrical surface of said other cylinder to permit rotary movement of said lower cylinder during steering movement of said road wheel while maintaining a seal between said cylinders.

2. A combined hydraulic shock absorber and telescopic control member for a steerable road wheel of a motor vehicle having a sprung member and a wheel spindle upon which said road wheel is rotatably mounted, comprising an upper cylinder adapted to be connected to said sprung member, a lower cylinder telescopically associated with said upper cylinder, bearing means between said cylinders permitting rotary and axial movement of said lower cylinder relative to said upper cylinder, said wheel spindle being mounted upon said lower cylinder so that steering movement of said road wheel effects rotary movement of said lower cylinder relative to said upper cylinder, a flexible boot having an axially extensible intermediate corrugated portion encircling said cylinders, said boot having one end secured to one of said cylinders, a radially outwardly facing channel shaped guideway carried by said other cylinder, an annular bearing ring carried by one end of said boot and received between and guided by the opposite side walls of said channel shaped guideway and slidably engaging the base of said guideway to form a seal therewith.

3. The structure defined by claim 2 which is further characterized in that said annular bearing ring has continuous ribs on its opposite sides for engaging the sides of said guideway and on its inner surface for engaging the base of said guideway.

References Cited in the file of this patent

UNITED STATES PATENTS

| | | |
|---|---|---|
| 2,567,144 | Butterfield | Sept. 4, 1951 |
| 2,784,017 | Bermingham | Mar. 5, 1957 |